United States Patent
Wilensky et al.

(10) Patent No.: US 9,141,335 B2
(45) Date of Patent: Sep. 22, 2015

(54) NATURAL LANGUAGE IMAGE TAGS

(71) Applicant: Adobe Systems Incorporated, San Jose, CA (US)

(72) Inventors: Gregg D. Wilensky, Pacific Palisades, CA (US); Walter W. Chang, San Jose, CA (US); Lubomira A. Dontcheva, San Francisco, CA (US); Gierad P. Laput, Canton, MI (US); Aseem O. Agarwala, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 29 days.

(21) Appl. No.: 13/683,466

(22) Filed: Nov. 21, 2012

(65) Prior Publication Data

US 2014/0078076 A1    Mar. 20, 2014

Related U.S. Application Data

(60) Provisional application No. 61/702,625, filed on Sep. 18, 2012.

(51) Int. Cl.
| | |
|---|---|
| *G06F 17/20* | (2006.01) |
| *G06F 3/16* | (2006.01) |
| *G06T 11/60* | (2006.01) |
| *G06F 3/0484* | (2013.01) |
| *G06F 3/0488* | (2013.01) |

(52) U.S. Cl.
CPC ............ *G06F 3/167* (2013.01); *G06F 3/04845* (2013.01); *G06F 3/04883* (2013.01); *G06T 11/60* (2013.01); *G06F 17/20* (2013.01); *G06F 2203/0381* (2013.01)

(58) Field of Classification Search
CPC ............. G09G 5/00; G06F 3/00; G06F 17/00; G06F 17/20; A63F 13/00
USPC .......... 345/173, 179, 619; 715/233, 234, 255, 715/721; 463/33; 434/98
See application file for complete search history.

(56) References Cited

U.S. PATENT DOCUMENTS

| | | |
|---|---|---|
| 4,726,065 A | 2/1988 | Froessl |
| 5,526,020 A | 6/1996 | Campanelli et al. |
| 6,133,904 A | 10/2000 | Tzirkel-Hancock |
| 6,243,713 B1 | 6/2001 | Nelson et al. |
| 6,970,185 B2 | 11/2005 | Halverson |
| 7,493,253 B1 | 2/2009 | Ceusters et al. |
| 7,539,619 B1 | 5/2009 | Seligman et al. |
| 7,593,603 B1 | 9/2009 | Wilensky |
| 7,739,597 B2 * | 6/2010 | Wong et al. ................... 715/721 |

(Continued)

OTHER PUBLICATIONS

"Non-Final Office Action", U.S. Appl. No. 13/683,278, Jun. 20, 2014, 10 pages.

(Continued)

*Primary Examiner* — Claire X Pappas
*Assistant Examiner* — Abdul-Samad A Adediran
(74) *Attorney, Agent, or Firm* — Wolfe-SBMC

(57) ABSTRACT

Natural language image tags are described. In one or more implementations, at least a portion of an image displayed by a display device is defined based on a gesture. The gesture is identified from one or more touch inputs detected using touchscreen functionality of the display device. Text received in a natural language input is located and used to tag the portion of the image using one or more items of the text received in the natural language input.

20 Claims, 9 Drawing Sheets

(56) References Cited

U.S. PATENT DOCUMENTS

| | | |
|---|---|---|
| 7,844,458 B2 | 11/2010 | Hirota et al. |
| 7,978,938 B1 | 7/2011 | Wilensky |
| 8,218,026 B2 | 7/2012 | Oishi |
| 8,619,147 B2 | 12/2013 | Kin et al. |
| 2002/0069070 A1 | 6/2002 | Boys et al. |
| 2003/0093419 A1 | 5/2003 | Bangalore et al. |
| 2003/0204814 A1* | 10/2003 | Elo et al. ............ 715/513 |
| 2005/0080611 A1 | 4/2005 | Huang et al. |
| 2006/0155693 A1 | 7/2006 | Chowdhury et al. |
| 2007/0057930 A1* | 3/2007 | Iwema et al. ............ 345/179 |
| 2007/0225969 A1 | 9/2007 | Coffman et al. |
| 2007/0238520 A1* | 10/2007 | Kacmarcik ............ 463/33 |
| 2008/0003547 A1 | 1/2008 | Woolfe et al. |
| 2008/0007749 A1 | 1/2008 | Woolfe |
| 2008/0252595 A1 | 10/2008 | Boillot |
| 2009/0256947 A1 | 10/2009 | Ciurea et al. |
| 2010/0121636 A1 | 5/2010 | Burke et al. |
| 2010/0191773 A1 | 7/2010 | Stefik et al. |
| 2010/0280829 A1 | 11/2010 | Gopi et al. |
| 2011/0007078 A1 | 1/2011 | Cao et al. |
| 2011/0082710 A1 | 4/2011 | Subash et al. |
| 2011/0099157 A1 | 4/2011 | LeBeau et al. |
| 2011/0106534 A1 | 5/2011 | Lebeau et al. |
| 2011/0246204 A1 | 10/2011 | Chen et al. |
| 2012/0022876 A1 | 1/2012 | Lebeau et al. |
| 2012/0035932 A1 | 2/2012 | Jitkoff |
| 2012/0042022 A1 | 2/2012 | Sheth et al. |
| 2012/0151326 A1 | 6/2012 | Cross, Jr. et al. |
| 2012/0166180 A1 | 6/2012 | Au |
| 2012/0191460 A1 | 7/2012 | Ng-Thow-Hing et al. |
| 2013/0283185 A1 | 10/2013 | Mock |
| 2014/0078075 A1 | 3/2014 | Wilensky |
| 2014/0081625 A1 | 3/2014 | Wilensky |
| 2014/0081626 A1 | 3/2014 | Chang |
| 2014/0082500 A1 | 3/2014 | Wilensky |

OTHER PUBLICATIONS

"Non-Final Office Action", U.S. Appl. No. 13/683,341, Aug. 19, 2014, 15 pages.

"Final Office Action", U.S. Appl. No. 13/683,341, Jan. 16, 2015, 16 pages.

"Non-Final Office Action", U.S. Appl. No. 13/683,278, Feb. 13, 2015, 12 pages.

"Non-Final Office Action", U.S. Appl. No. 13/683,416, Mar. 18, 2015, 14 pages.

"Non-Final Office Action", U.S. Appl. No. 13/683,509, Feb. 20, 2015, 18 pages.

"Final Office Action", U.S. Appl. No. 13/683,416, Aug. 5, 2015, 15 pages.

"Non-Final Office Action", U.S. Appl. No. 13/683,341, Jul. 6, 2015, 18 pages.

"Non-Final Office Action", U.S. Appl. No. 13/683,509, Jul. 8, 2015, 20 pages.

* cited by examiner

NATURAL LANGUAGE IMAGE TAGS

CROSS REFERENCE

This Application claims priority under 35 U.S.C. Section 119(e) to U.S. Provisional Patent Application No. 61/702,625, filed Sep. 18, 2012, and titled "Natural Language Image Tags," the disclosure of which is hereby incorporated by reference in its entirety.

BACKGROUND

The functionality made available via image editing and other applications is ever increasing. For example, users may enhance, crop, composite, matte, and alter image data using a multitude of different operations.

However, the sheer number of choices of operations that are made available may make it difficult for a user to locate a particular operation of interest. This may include making the user aware of the operation and even locating functionality to initiate to operation once aware. Further, determining a portion of an image that is to be the subject of the operation may be inefficient using conventional techniques. Consequently, users may choose to forgo this functionality, which may hinder a user's experience with the applications.

SUMMARY

Natural language image tags are described. In one or more implementations, at least a portion of an image displayed by a display device is defined based on a gesture. The gesture is identified from one or more touch inputs detected using touchscreen functionality of the display device. Text received in a natural language input is located and used to tag the portion of the image using one or more items of the text received in the natural language input.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Interaction with applications may be complex. The inclusion of a multitude of operations, for instance, may make it difficult for a user to discover a particular one of the operations of the application. Even when the operations are discovered and understood, initiation of a desired operation may involve multiple steps. These steps may be complex and often involve skills developed by professionals and as such may even tax the skills of professional users. Additionally, although other operations may be simpler to locate and initiate, these operations may involve multiple manual steps and therefore be considered tedious by a user. Consequently, novice and even professional users of conventional applications may become frustrated with conventional techniques that are used to interact with the applications.

Natural language image tag techniques are described. In one or more implementations, a natural language processing module may be employed to determine a likely intent of a user that provided a natural language input. This intent may be used to identify an operation that is to be performed, such as an image editing operation. Further, these techniques may be used to implement and utilize tags to identify portions of that are to be a subject of an operation. For example, a user may tag an individual user in an image, such as "Dad." A user may then subsequently specify an operation to be performed on that portion of the image that includes "Dad," such as "make Dad less dark." In this way, a user may intuitively interact with an application to both specify operations and portions of an image or other data (e.g., document, spreadsheet, and so on) that are to be a subject of the operations, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
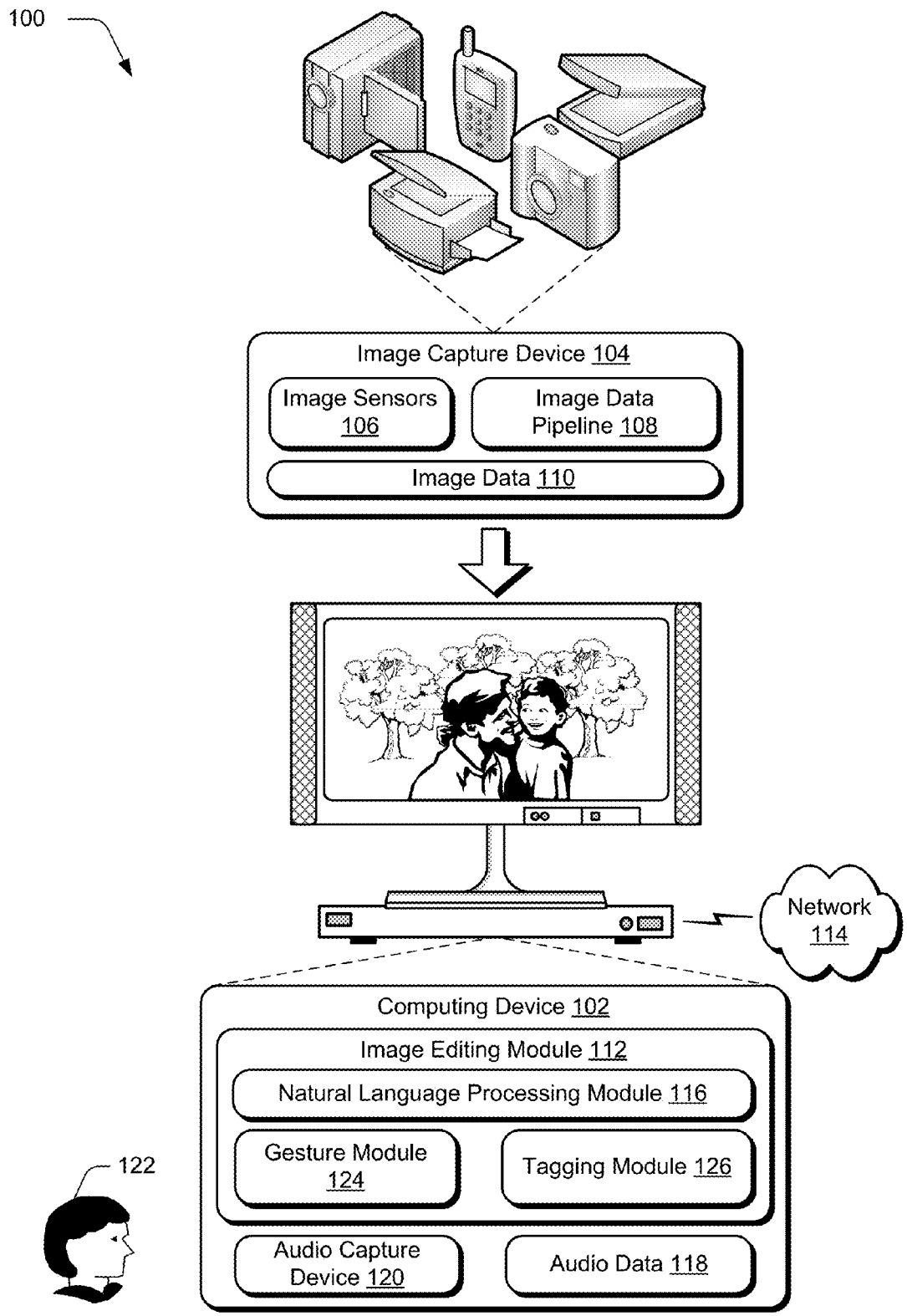
FIG. 1 is an illustration of an environment in an example implementation that is operable to employ techniques described herein relating to natural language inputs.

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device, e.g., for a tablet configuration, smart phone as illustrated, and so forth.

The image capture device 104 is illustrated as including image sensors 106 and an image data pipeline 108 that are each configured to form image data 110. For example, the image sensors 106 may be configured to capture images using a Bayer pattern or other configurations. Therefore, in this instance, the image data 110 generated by the image sensors 106 may be considered to be in a raw image format.

The image data 110 may also be processed by an image data pipeline 108 using a variety of different operations. These operations may include operations in which the image data 110 is considered to remain in a substantially raw image format. Examples of these operations include interpolation of the image data in the raw format (e.g., a Bayer pattern) into a red, green, and blue image format, de-mosaicking, and linear processing operations. The image data pipeline 108 may also perform operations in which the image data 110 is not in a raw or substantially raw image format, such as to perform gamma correction, sharpening, de-noising, or other non-linear operations. Thus, the image data 110 may be configured according to a variety of different image formats.

Further, the image data 110 is not limited to capture by an image capture device 104. The image data 110, for instance, may be generated through interaction of a user with a user interface, automatically through execution of an application, and so on. Thus, the image data 110 may also originate from a variety of different sources.

Regardless of how the image data 110 is originated, the image data 110 may then be obtained by an image editing module 112. As before, although the image editing module 112 is illustrated as being implemented on a separate device it should be readily apparent that other implementations are also contemplated in which the image sensors 106 and image editing module 112 are implemented on the same device. Further, although illustrated as being provided by a computing device 102 in a desktop configuration, a variety of other configurations are also contemplated, such as a tablet, remotely over a network 114 as part of a web platform as further described in relation to FIG. 9, and so on.

The image editing module 112 is representative of functionality that is configured to process the image data 110 using one or more operations. Examples of such functionality in FIG. 1 include operations to edit the image data 110, such as to change a display characteristic of one or more pixels described by the image data 110, decompose the image data 110, composite the image data 110 (e.g., with other image data to form a new image), and so forth. However, as previously described the sheer multitude of operations that may be made available may make it difficult to interact with the image editing module 112.

Accordingly, the image editing module 112 is illustrated as including a natural language processing module 116. The natural language processing module 116 is representative of functionality to process a natural language input, such as text, audio data 118, and so on. For example, the audio data 118 may be captured by an audio capture device 120 from a user 122. Other examples are also contemplated, such as audio data received via the network 114 (e.g., through configuration of the computing device 102 as part of a web service), and so on. The natural language processing module 116, for instance, may be configured to process audio data 118 to initiate one or more operations of the image editing module 112.

The image editing module 112 is also illustrated as including a gesture module 124. The gesture module 124 is representative of functionality to recognize gestures detected via touch functionality by the computing device 102. Touch functionality may be implemented using a variety of touch sensors, including capacitive sensors, resistive sensors, image sensors, strain gauges, and so on. The computing device 102, for instance, may include a display device having touchscreen functionality, track pad, camera, and so on. These devices may be used to detect proximity of an object and recognize initiation of an operation based on this proximity, movement of the object, and so on.

The image editing module 112 is also illustrated as including a tagging module 126. The tagging module 126 is representative of functionality to tag a portion of data for use in specifying operations to be performed on that portion using a natural language input. In this way, a user may cause a variety of different operations to be performed on a variety of different portions of data, such as objects included in an image, in an intuitive manner. Accordingly, although image editing operations are described as examples herein, it should be apparent that a variety of different operations for a variety of different applications may also leverage these techniques without departing from the spirit and scope thereof.

Figure 2:
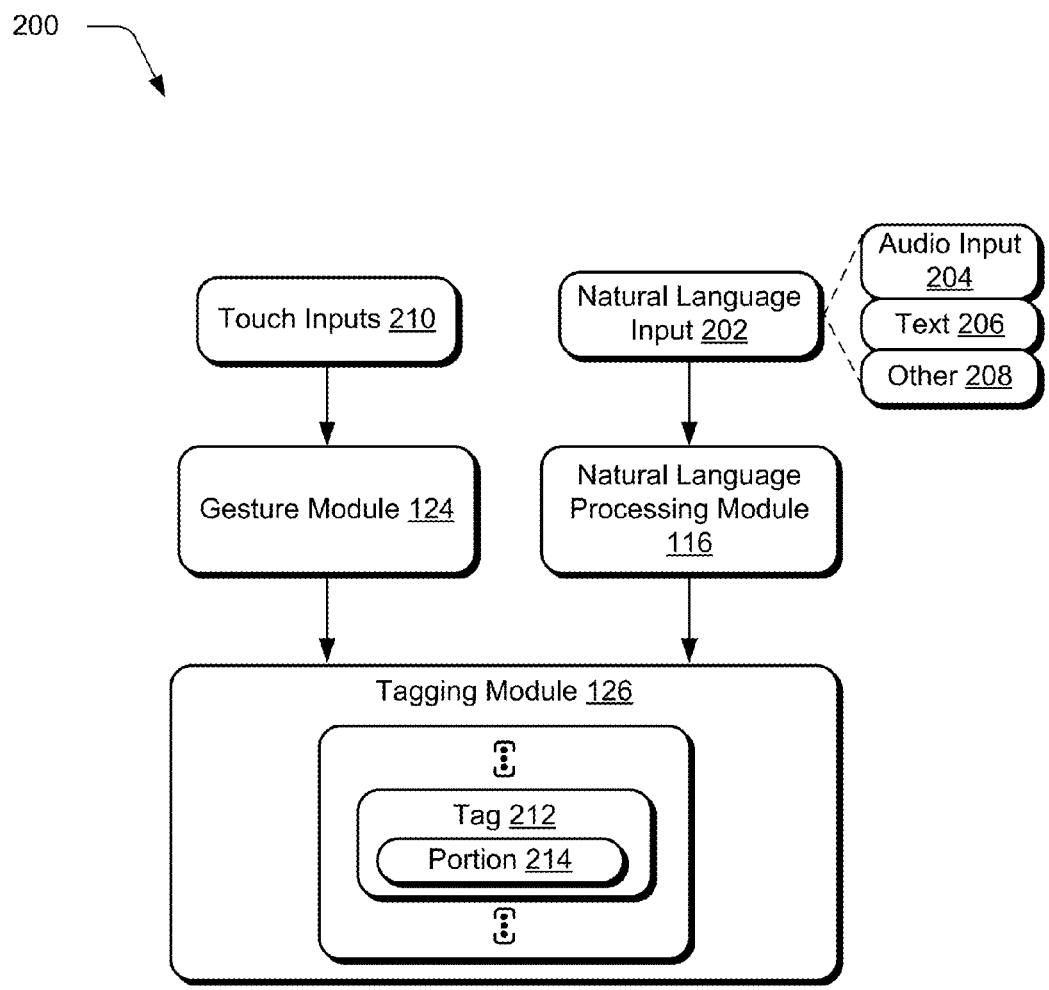
FIG. 2 depicts a system in an example implementation showing operation of a tagging module to tag a portion of data.

FIG. 2 depicts a system 200 in an example implementation showing operation of a tagging module 126 to tag a portion of data. A natural language input 202 is illustrated as being received by an image editing module 112. The natural language input 202 may originate from a variety of different sources, such as an audio input 204 that is converted to text using a speech-to-text engine, text 206 that is manually entered by a user, or other 208 sources.

Regardless of the source, the natural language input 202 may be received by a natural language processing module 116. The natural language processing module 116 is representative of functionality to process the natural language input 202 to identify text. The natural language input module 116, for instance, may be used to identify text that is indicative of a name, operation, degree of performance for the operation (e.g., strength), usable in part to identify a portion of data, and so on. This may include use of semantic distances and lexicon ontologies to identify which text recognized by the natural language processing module 116 likely corresponds to text associated with an operation, such as to support mapping of a general vocabulary to a constrained vocabulary of operations, subjects of an operation, and so on.

The system is also illustrated as processing one or more touch inputs 210 by a gesture module 124 to recognize a gesture. The touch inputs 210, for instance, may be useable by the gesture module 124 to recognize a gesture as previously described. A gesture may also be utilized to support a variety of different functionality, such as to indicate a name, operation, degree of performance for the operation (e.g., strength), usable in part to identify a portion of data, and so on.

The tagging module 126 may receive a result of processing of the natural language processing module 116 and the gesture module 124 to associate a tag 212 with a corresponding portion 214 of data, such as to identify a portion of an image. For example, a gesture may be recognized by the gesture module 124 from one or more touch inputs 210 that is usable to specify the portion. A natural language input 202 may also be received in conjunction with the gesture that is usable to provide the tag 212 for the portion 214. The tag 212 may then be used in subsequent inputs to cause operations to be performed on the portion.

In another example, a natural language input 202 may be processed by the natural language processing module 116 to specify the portion and the gesture module 124 may recognize a gesture that is to provide a tag 212 for the portion. Thus, like before the tag 212 may then be used in subsequent input to cause operations to be performed using the portion. Further discussion of these examples may be found in relation to the following description and associated figures.

Figure 3:
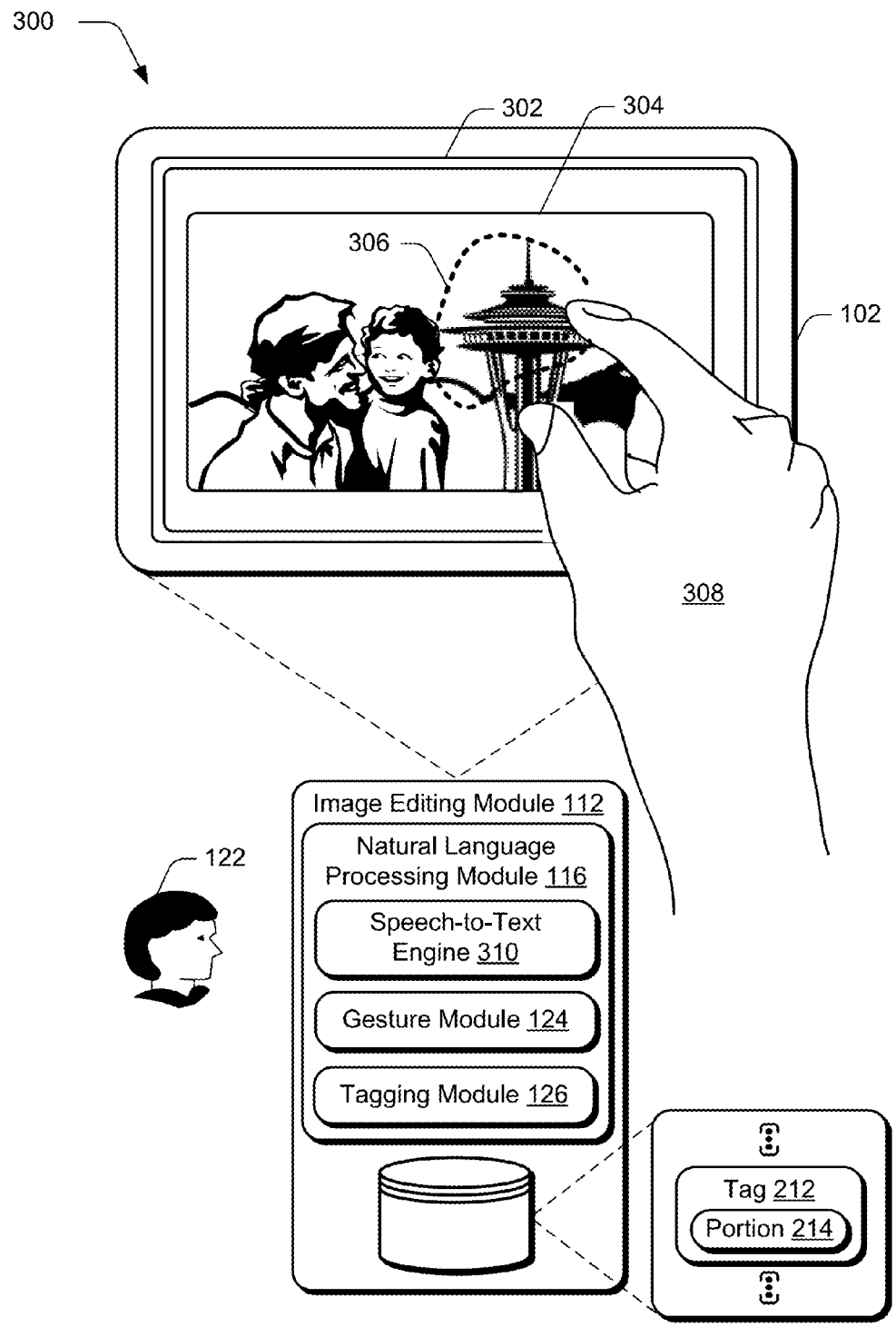
FIG. 3 depicts a system in an example implementation in which a gesture is used to identify a portion and a natural language input is utilized to provide a tag for the portion.

FIG. 3 depicts a system 300 in an example implementation in which a gesture is used to identify a portion 214 and a natural language input is utilized to provide a tag 212 for the portion. In this example, the computing device 102 is illustrated as assuming a hand-held configuration, such as a tablet computer although other examples are also contemplated. Through inclusion of the natural language processing module 116 and gesture module 124, operations of the tagging module 126 may be implemented in a variety of ways.

The computing device 102 is illustrated as including a display device 302 that supports touch functionality, such as through the use of one or more touch sensors that are configured to detect proximity of an object through configuration as capacitive, resistive, or image capture sensors. An image 304 is displayed by the display device 302 of image data 110 obtained by the image editing module 112 as described in FIG. 1.

A gesture 306, for instance, may be performed as a series of touch inputs as shown in phantom using a finger of a user's hand 308, although other examples are also contemplated. In this example, the touch inputs define at least part of a boundary of an object included in the image 304, which is the Space Needle in this example. Thus, the gesture 306 defines a portion 214 of the image 304.

A natural language input may also be provided, but in this instance to provide an identification to be used for the portion 214 of the image 204 as the tag 212. For example, audio data 118 may be received from a user 122 and processed using a speech-to-text engine 310, captured manually, and so on. The natural language input may provide text that may be used as a tag 212 for the portion 214. In the illustrated example, the natural language input "Space Needle" may be received in conjunction with the gesture 306 specifying the portion 214 of the image 304.

Figure 6:
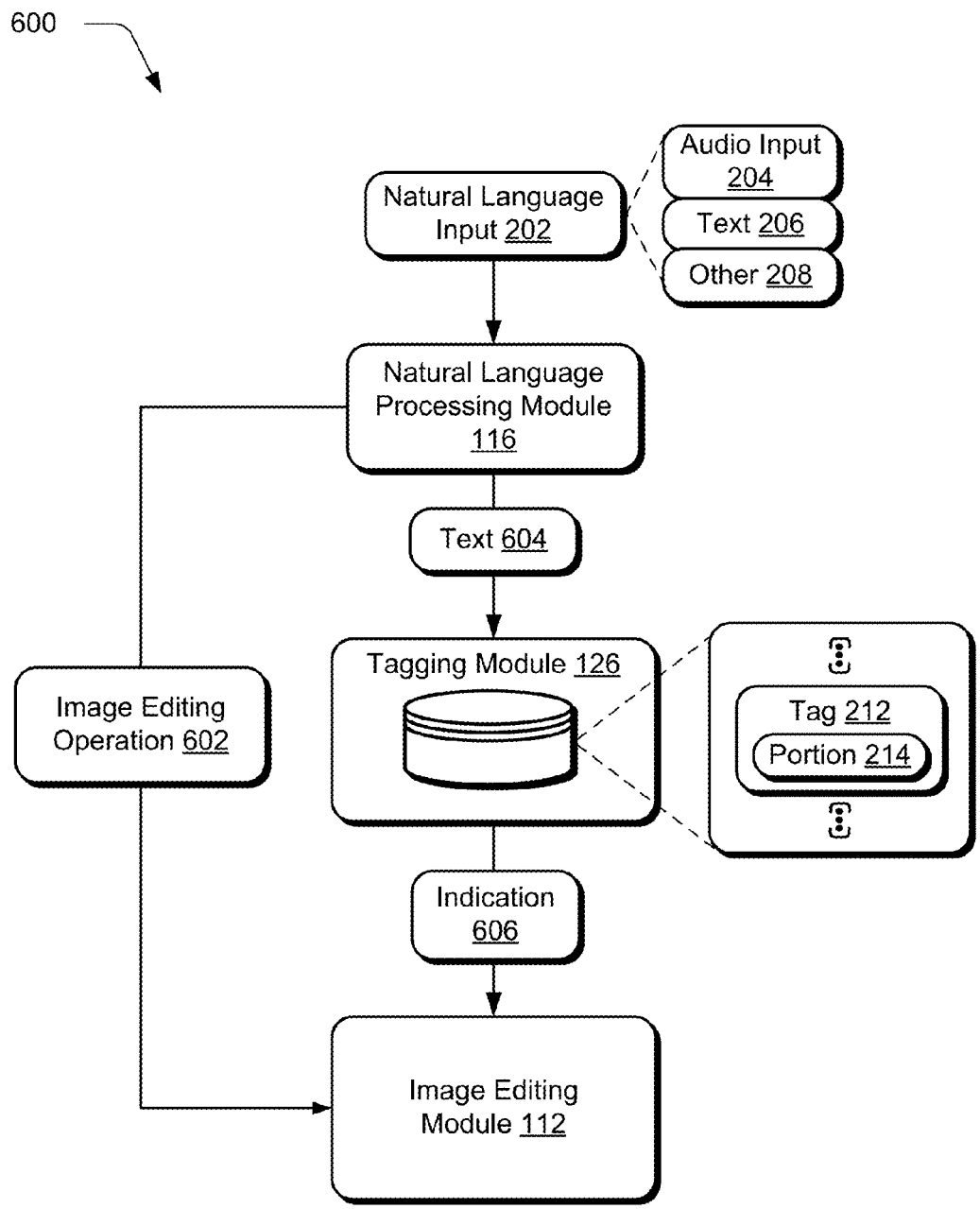
FIG. 6 depicts a system in an example implementation in which a natural language input is processed to initiate performance of an operation on a portion having an associated tag.

Thus, the portion 214 identified by the gesture 306 may be associated with the tag 212 "Space Needle" by the tagging module 126 for use in performance of operations, further discussion of which may be found in relation to the discussion of FIG. 6. A variety of other gestures and functionality may also be utilized to specify the portion 214, an example of which may be found in the following discussion and associated figure.

Figure 4:
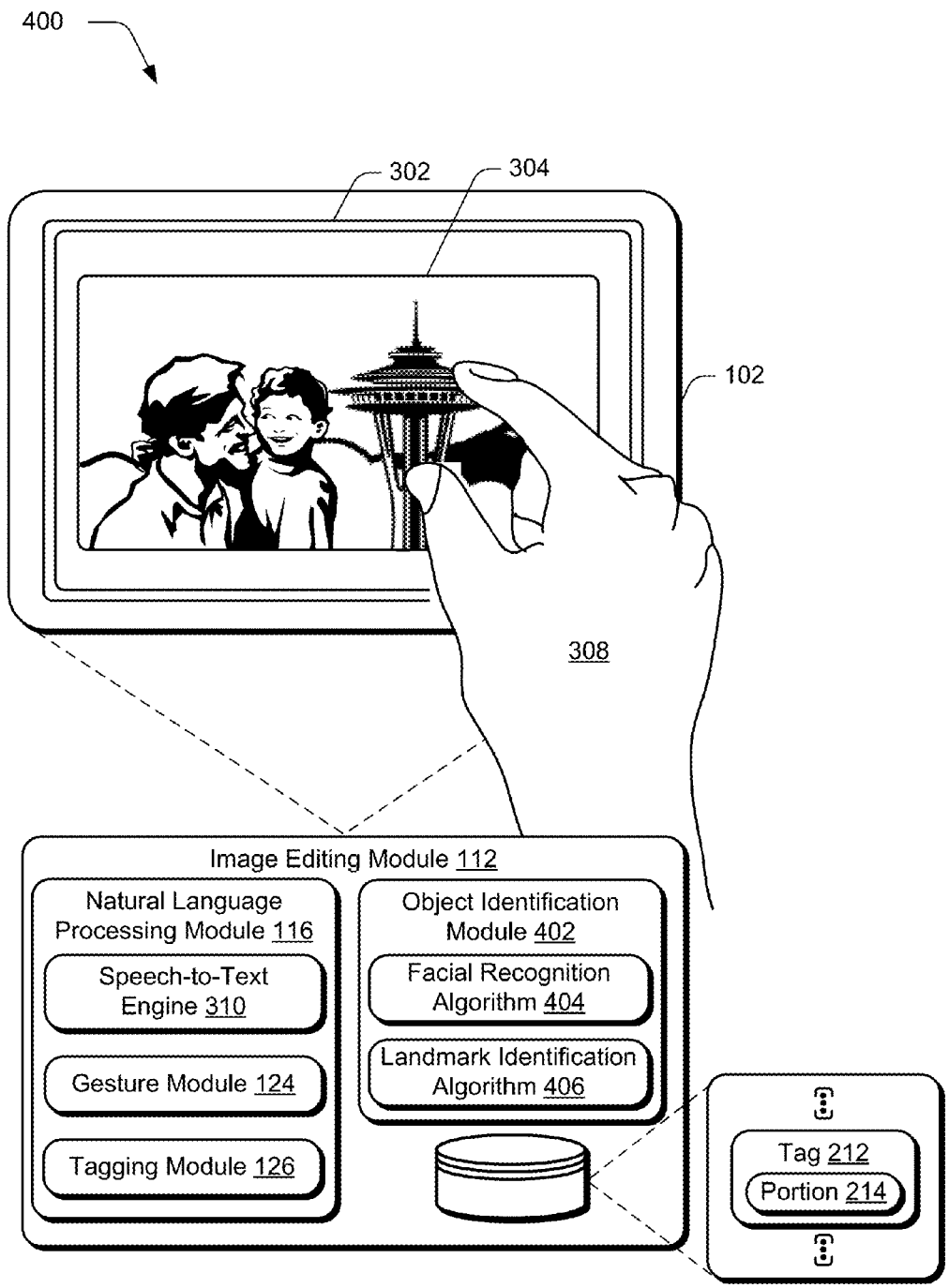
FIG. 4 depicts a system in an example implementation in which yet another example of operation of the tagging module is shown.

FIG. 4 depicts a system 400 in an example implementation in which yet another example of operation of the tagging module 126 is shown. In the previous example a boundary of an object was defined using a gesture, itself. A gesture may also be used to initiate functionality that may be used to identify a subject of an image editing operation.

A finger of a user's hand 308, for instance, may tap a location of an image 304 displayed by the display device 302. One or more touch sensors of the display device 302 may register this tap. The tap may then be recognized as a gesture by the gesture module 124 to indicate a part of an object that is to be a subject of an image editing operation.

The gesture may then cause operation of an object identification module 402 to identify an object in the image 304 associated with the location of the tap, which may include identification of a boundary of the object in the image 304. The object identification module 402, for instance, may employ one or more facial recognition algorithms 404 to recognize a user in the image 304, such as the "Dad," "Son," and so on responsive to a tap on those portions of the image. By using the facial recognition algorithm 404, boundaries of these people may be determined and used to define the portion 214.

In another instance, the object identification module 402 may employ a landmark identification algorithm 406. The landmark identification algorithm 406 may be used to identify geographical and other landmarks that are included in the image 304, such as the Space Needle in the illustrated example. Like before, the landmark identification algorithm 406 may be used to determine boundaries of the portion 214.

Although use of facial recognition and landmark identification was described, a variety of other techniques may also employed by the object identification module 402 to identify the portion 214. In the examples of FIGS. 3 and 4, a non-natural language gesture is used to define the portion 214 and a natural language input is utilized to provide the tag 212. Other examples are also contemplated, such as use of natural language inputs to define both the tag 212 and the portion 214, an example of which is described as follows.

Figure 5:
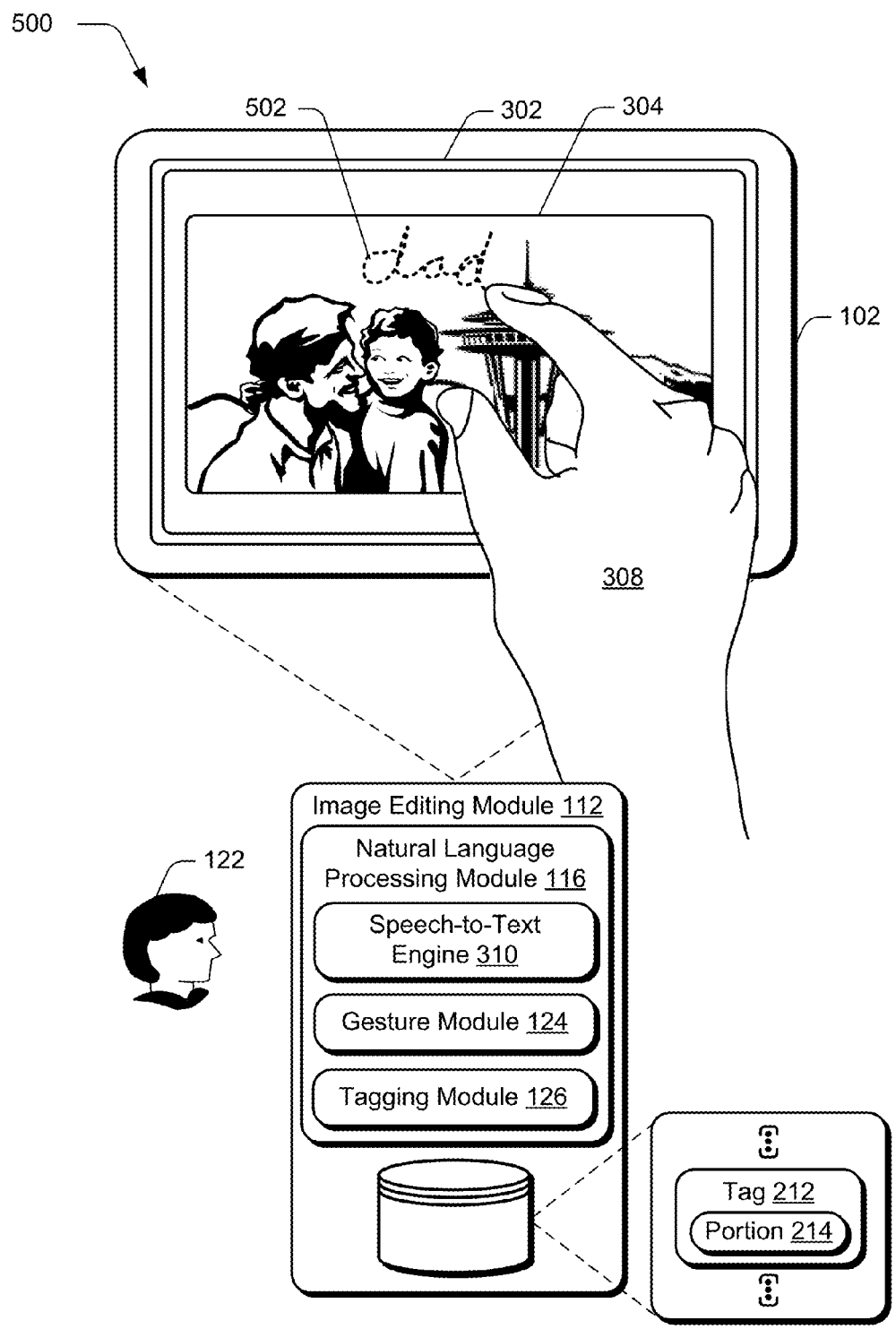
FIG. 5 depicts a system in an example implementation in which natural language inputs are used to define both a portion and a tag for the portion.

FIG. 5 depicts a system 500 in an example implementation in which natural language inputs are used to define both a portion 214 and a tag 212 for the portion 214. In this example, a natural language input is entered manually by a user. This is illustrated in phantom as drawing a word "dad" which may be recognized using touchscreen functionality as previously described, such as by employing the gesture module 124. Thus, the gesture 502 in this example may be utilized to provide a natural language input that specifies the tag 212.

This may be performed in conjunction with input of another natural language input, such as a speech input provided by a user and then processed by a speech-to-text engine 310 to identify text "name of person on the left." The tagging module 126 may then use both natural language inputs as the tag 212 and corresponding portion 214. Other examples are also contemplated, such as instances in which both the tag 212 and portion 214 are identified from text formed from processing performed by a speech-to-text engine, e.g., "the landmark is the Space Needle." Thus, a variety of different examples are discussed in relation to FIGS. 3-5 in which to form a tag 212 and portion 214. The tag 212 and portion 214 may then be used to efficiently initiate performance of operations involving the portion 214, further discussion of which may be found in the following description and corresponding figure.

FIG. 6 depicts a system 600 in an example implementation in which a natural language input 202 is processed to initiate performance of an operation on a portion having an associated tag. As before, a natural language input 202 may originate from a variety of different sources, such as an audio input 204, text 206, or other 208 sources. The natural language processing module 116 may then identify relevant parts of the natural language input. This may include identifying text describing an image editing operation 602 or other operation, such as contract, de-blur, sharpen, extract, matt, and so forth.

The natural language processing module 116 may also identify text 604 that is usable to locate a corresponding tag 212. The tagging module 126, for instance, may compare the text 604 received from the natural language processing module 116 with tags 212 stored as illustrated. Upon locating a tag 212 that matches text 604, the tagging module 126 may output an indication 606 of a portion 216 that corresponds to the tag 212. Therefore, the image editing module 112 may initiate performance of the image editing operation 602 on the portion 214 based on the indication. Continuing with the previous example, the natural language input 202 "make Dad less yellow," "improve the contrast of the Space Needle," and so on may be used to identify portions of an image 304 and operations to be performed on those portions. A variety of other examples are also contemplated without departing from the spirit and scope thereof.

Example Procedures

The following discussion describes natural language image tag techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the previous figures.

Figure 7:
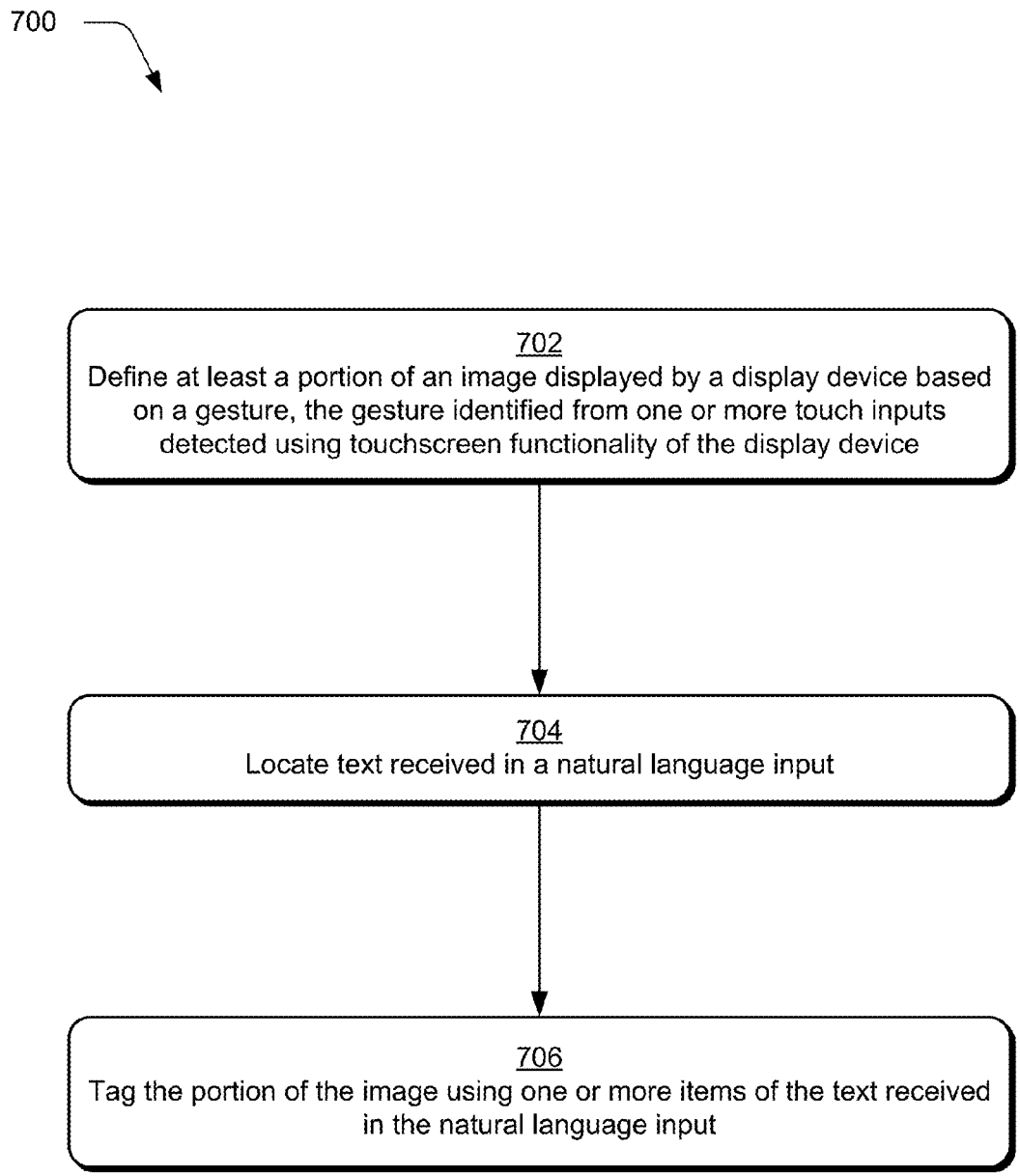
FIG. 7 depicts a procedure in an example implementation in which a portion of an image is defined based on a gesture and tagged using a natural language input.

FIG. 7 depicts a procedure 700 in an example implementation in which a portion of an image is defined based on a gesture and tagged using a natural language input. At least a portion of an image displayed by a display device is defined based on a gesture, the gesture identified from one or more touch inputs detected using touchscreen functionality of the display device (block 702). For example, a user may circle a portion of an image using one or more fingers of the user's hand 306 as shown in FIG. 3, provide a tap that is a basis for additional processing as shown in FIG. 4, and so on.

Text is located that is received in a natural language user input (block 704). This text may originate from an audio input that is then processed by a speech-to text engine 310 as shown in FIG. 3, written using one or more fingers of the user's hand 308 as shown in FIG. 5, typed using a keyboard, and so on.

The portion of the image is tagged using the one or more items of the text received in the natural language input (block 706). The tagging module 126, for instance, may receive the indication of the portion 214 from the gesture module 124 and use text received from the natural language processing module 116 to form a tag 212 for the portion 214. The tag 212 may then be used to initiate operations using the portion 214, an example of which is described as follows along with an associated figure.

Figure 8:
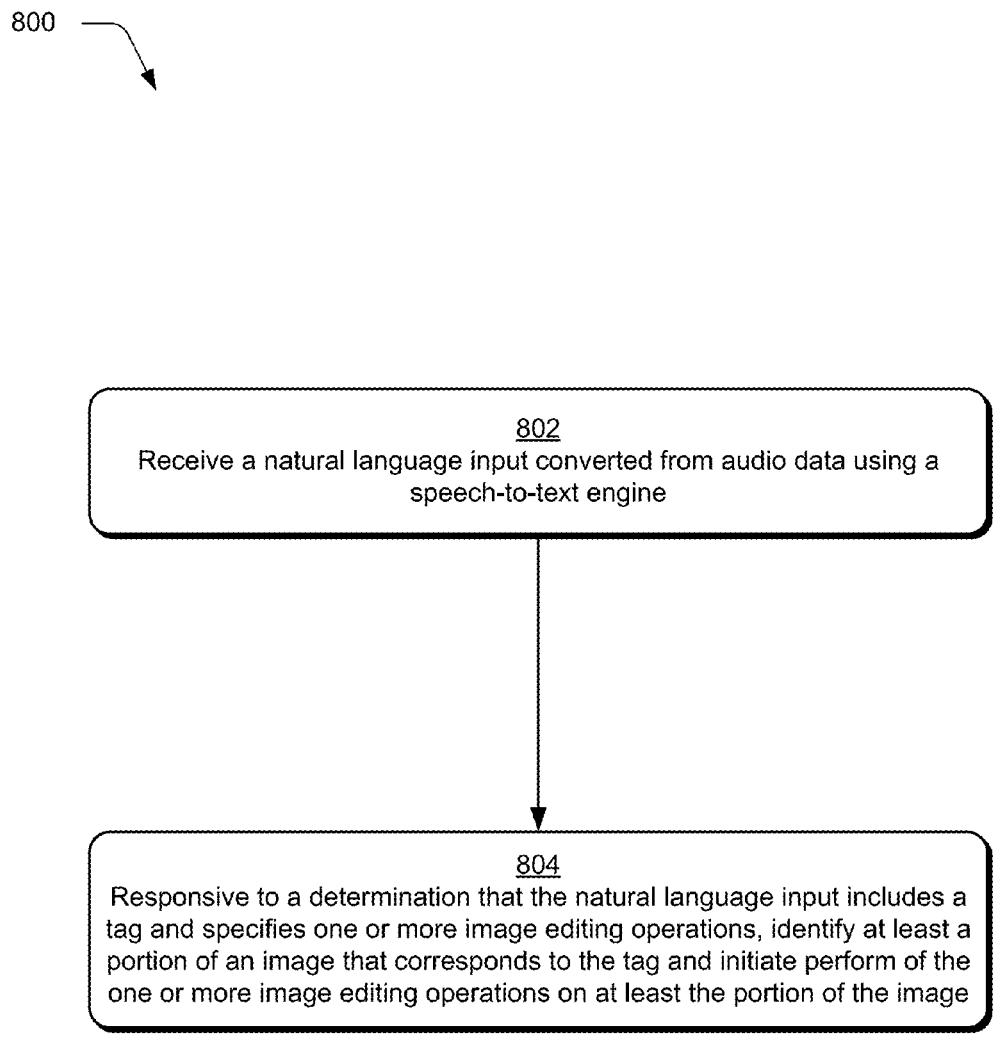
FIG. 8 depicts a procedure in an example implementation in which a tag generated for a portion as described in relation to FIG. 7 is used to initiate an operation using the portion.

FIG. 8 depicts a procedure 800 in an example implementation in which a tag generated for a portion as described in relation to FIG. 7 is used to initiate an operation using the portion. A natural language input is received that is converted from audio data using a speech-to-text engine (block 802). As previously described, a speech-to-text engine 310 may be used to convert audio data captured from a user 122 using an audio capture device 120.

Responsive to a determination that the natural language input includes a tag and specifies one or more image editing operations, at least a portion of an image is identified that corresponds to the tag and performance of one or more image editing operations is initiated on at least the portion of the image (block 804). A natural language input, for instance, may be received that includes the text "make Dad less orange." Accordingly, the input may be parsed to locate the tag "Dad" and a corresponding portion of an image that relates to "Dad." Additionally, the input may also be parsed to determine an operation that is to be performed on the portion, e.g., "less orange." In this way, a user may efficiently and intuitively interact with the image editing module 112 to initiate performance of desired operations. Other examples of operations are also contemplated that do not involve image editing without departing from the spirit and scope thereof.

Example System and Device

Figure 9:
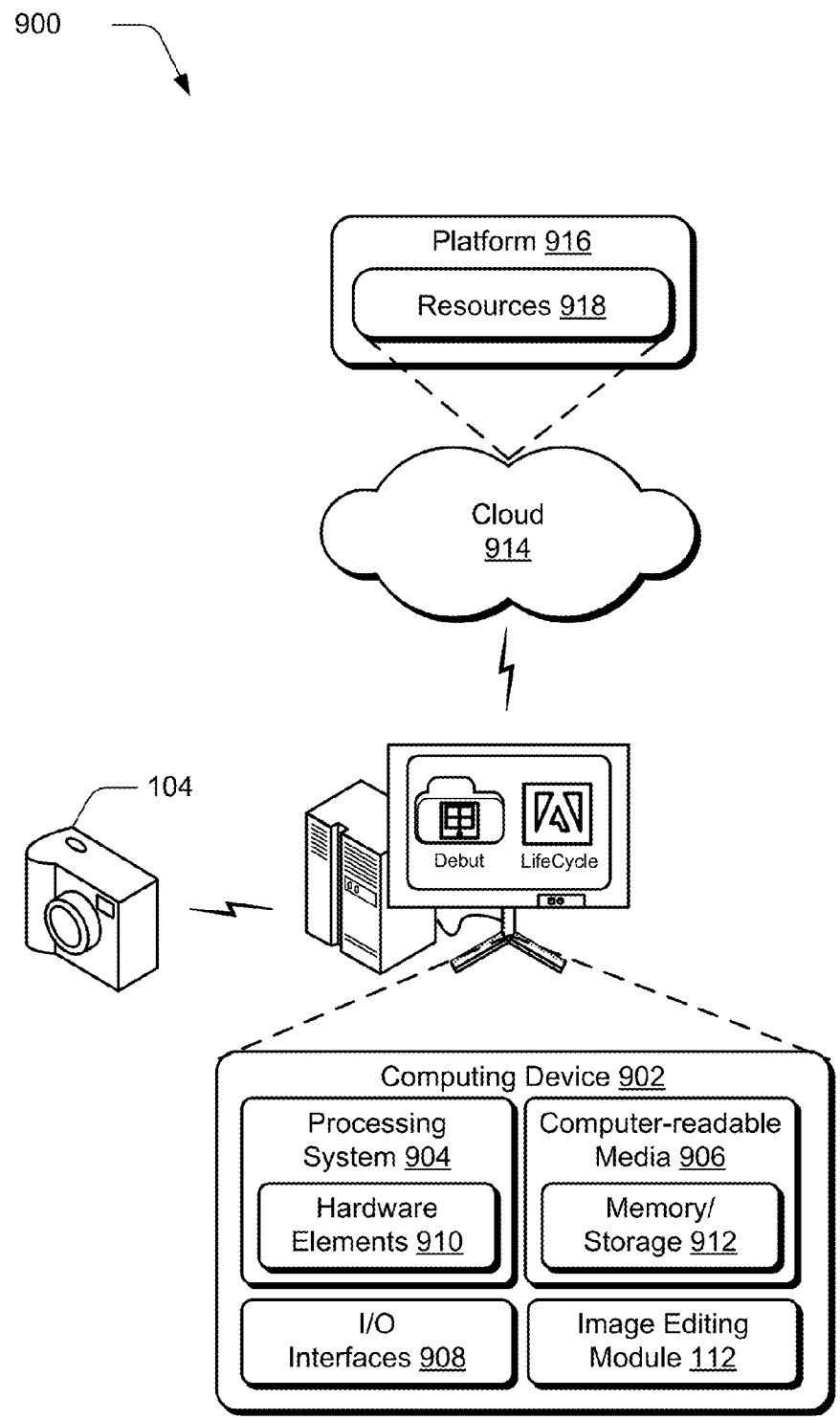
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the image editing module 112, which may be configured to process image data, such as image data captured by an image capture device 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    displaying an image by a display device;
    defining at least a portion of the image displayed based on a gesture, the gesture identified from one or more touch inputs detected using touchscreen functionality of the display device;
    receiving a processed natural language input subsequent to displaying the image, the processed natural language input processed from audio data that is based at least on a speech input from a user;
    locating one or more items in text received in the processed natural language input;
    tagging the portion of the image defined by the gesture with the one or more items of the text received in the processed natural language input, the tag effective to enable identification of the portion from an entirety of the image; and
    editing the portion of the image defined by the gesture and the processed natural language input.

2. A method as described in claim 1, wherein the editing the portion of the image is performed subsequent to receiving a subsequent processed natural language input without repeating performance of the gesture.

3. A method as described in claim 1, wherein the gesture is formed from a series of the one or more touch inputs that define at least part of a boundary of the portion of the image.

4. A method as described in claim 1, wherein the defining includes identifying a base of the image that is to be subject of further processing by an object identification module to determine a boundary of the portion.

5. A method as described in claim 4, wherein the object identification module employs one or more facial recognition algorithms to determine the boundary of the portion.

6. A method as described in claim 4, wherein the object identification module employs one or more algorithms to identify landmarks to determine the boundary of the portion.

7. A method as described in claim 4, wherein the base is identified using a tap involved in the gesture.

8. A method as described in claim 1, wherein the one or more items are identified from the text as proper names.

9. A method as described in claim 1, wherein the text is received in the processed natural language input in conjunction with performance of the gesture.

10. A method comprising:
    receiving a processed natural language input converted from audio data using a speech-to-text engine, the processed natural language input processed from the audio data, the audio data based on at least a speech input from a user; and
    responsive to a determination that the processed natural language input includes a tag corresponding to a portion of an image, the tag effective to enable identification of the portion from an entirety of the image, and specifies one or more image editing operations:
        identifying the portion of the image that corresponds to the tag; and
        initiating performance of the one or more image editing operations on the portion of the image based on the tag and the processed natural language input.

11. A method as described in claim 10, wherein the portion of the image is tagged responsive to a gesture identified from one or more touch inputs and another processed natural language input received from the user.

12. A method as described in claim 11, wherein a boundary of the portion of the image is defined responsive to execution of an object detection algorithm.

13. A method as described in claim 10, wherein the tag is a proper name assigned to the portion of the image.

14. A method as described in claim 10, wherein the processed natural language input specifies a plurality of said image editing operations and the initiating is performed for the plurality of said image editing operations.

15. A system comprising:
    a speech-to-text engine configured to convert audio data captured by one or more audio-capture devices into a processed natural language input comprising text, the processed natural language input processed from the audio data, the audio data based on at least a speech input from a user;
    a gesture module configured to recognize a gesture from one or more touch inputs detected using one or more touch sensors, the gesture involving a portion of an image displayed by a display device, the portion comprising less than an entirety of the image;
    an object identification module configured to identify one or more objects in the image corresponding to the portion including a boundary of the identified one or more objects, respectively; and
    a natural language processing module configured to:
        identify a name from the processed natural language input;
        initiate operation of the object identification module to identify at least one said object in the image corresponding to the portion that corresponds to the name; and
        tag the identified object in the image corresponding to the portion using the name such that a subsequent processed natural language input that includes the name and specifies an editing operation is usable to initiate performance of the editing operation using the identified object corresponding to the portion, the tag effective to enable identification of the portion from the entirety of the image for the editing operation, the editing operation performed on the portion of the image based on the tag and the subsequent processed natural language input.

16. A system as described in claim 15, wherein the gesture is formed from a series of the one or more touch inputs that define at least part of a boundary of a portion of the image, the portion including the at least one said object.

17. A system as described in claim 15, wherein the gesture identifies a base of the image that is to be subject of the operation of the object identification module to identify the at least one said object.

18. A system as described in claim 15, wherein the object identification module is configured to employ one or more facial recognition algorithms to determine the boundary.

19. A system as described in claim 15, wherein the object identification module is configured to employ one or more algorithms to identify landmarks to determine the boundary.

20. A system as described in claim 15, wherein the processed natural language input comprises text received from a user.

* * * * *